Oct. 30, 1962     G. L. FRANSSON     3,060,562
METHOD OF CONNECTING A SCREW TO A PLATE OR PLATE-LIKE ELEMENT
Filed July 19, 1960
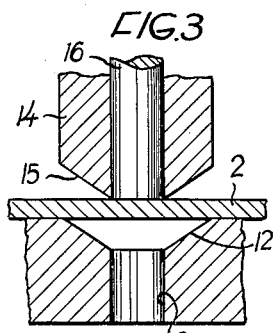
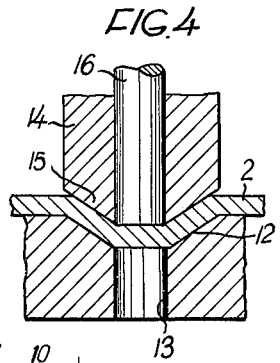
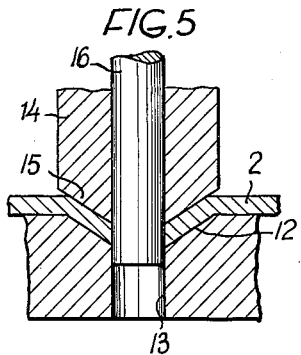
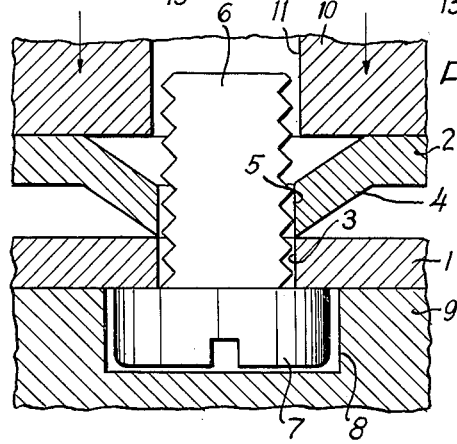
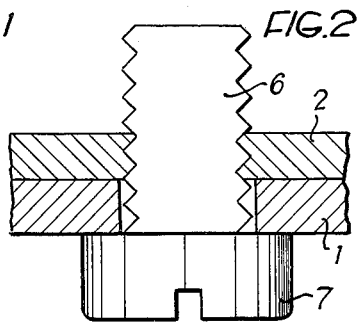
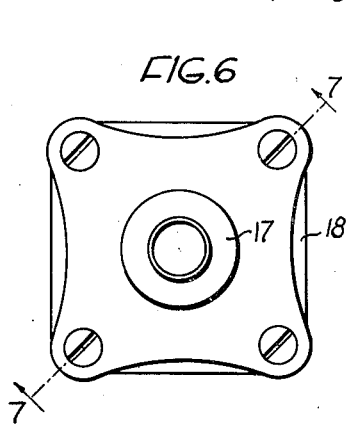
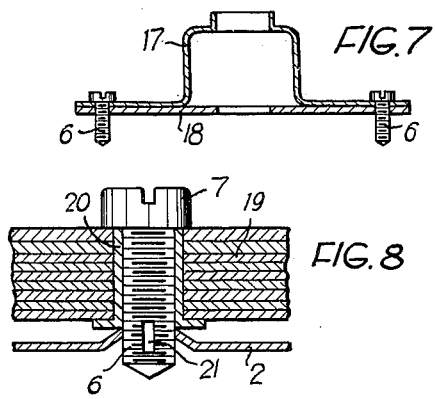
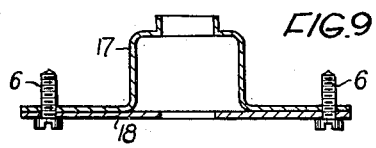
INVENTOR.
Georg Leonard Fransson,
BY Pierce, Scheffler & Parker
his Attorneys

United States Patent Office 3,060,562
Patented Oct. 30, 1962

3,060,562
METHOD OF CONNECTING A SCREW TO A PLATE OR PLATE-LIKE ELEMENT
Georg Leonard Fransson, Stockholm, Sweden, assignor to Aktiebolaget Galco, a corporation of Sweden
Filed July 19, 1960, Ser. No. 43,851
Claims priority, application Sweden July 29, 1959
4 Claims. (Cl. 29—437)

This invention relates to a method of connecting a screw to a plate or plate-like element.

This is at present done either by forming a threaded aperture in the plate or plate-like element, and then screwing the screw into the aperture, or screwing a nut on to the shank of the screw. This is laborious, especially when a plurality of screws or nuts have to be screwed respectively into apertures or onto the shanks, and, in comparison with the method according to the present invention.

In the method according to the present invention the screw, which is made of harder material than the plate, is inserted into an aperture which has a diameter only slightly greater than that of the screw and which is located in and on the axis of a frusto-conical protuberance in the plate, and the protuberance is then flattened by axial pressure so that the edge of the aperture engages the threads of the screw.

Thus it is not necessary to form threads in the plate or plate-like element, and no individual screwing of the screws or bolts is required. In addition there is no problem of screw-nut tolerances.

Provided the clearance between the screw and the aperture in the protuberance in relation to the angle of the cone is not too small, the screw can subsequently be unscrewed in the normal manner.

The apertured protuberances are preferably formed by pressing a frusto-conical protuberance, and then punching the aperture in the protuberance. In this way the aperture has a cylindrical surface whose axis is the same as that of that of the protuberance.

Several protuberances may be formed simultaneously; and they may be flattened simultaneously in one operation. Thus the invention enables several different operations, which previously have been performed individually, to be performed simultaneously.

The method may be used for assembling two plates; one plate, which constitutes a lock plate, has the protuberances and is located further from the head of the screw than the other plate. When the protuberance is flattened, the second plate is clamped between the head of the screw and the lock plate.

The plate in which the protuberances are formed may be a constructional element; and the element may be formed at the same time, for example by pressing, as the protuberance.

The following are examples of suitable materials for the plate: soft iron having a carbon content below 0.3%; aluminium or aluminium alloys; or plastic.

The invention will now be particularly described, by way of example only, with reference to the accompanying drawings in which:

FIGURES 1 and 2 illustrate how a plate-like member is connected to a headed screw;

FIGURES 3 to 5 illustrate three steps in the formation of an apertured frusto-conical protuberance in a lock plate used in the method according to FIGURES 1 and 2;

FIGURES 6 and 7 illustrate how a construction element has been connected to a plate-like member, FIGURE 7 being a section on the line 7—7 of FIGURE 6;

FIGURE 8 illustrates the application of the invention to the assembly of a stack of laminations; and FIGURE 9 shows a modification of the connection shown in FIGURES 6 and 7.

In FIGURES 1 and 2 a plate-like member 1 is to be connected to a screw 6 by a locking plate 2.

The plate-like member 1, which may for example be a backing plate, has an aperture 3. The locking plate 2, which may have no other function or which may be part of a construction element as shown in FIGURE 9, has a frusto-conical protuberance 4 in which a cylindrical aperture 5 is formed. The member 1 and locking plate 2 are juxtaposed, so that the protuberance 4 projects towards the member 1.

The screw 6, which has a head 7, is located in the apertures 3 and 5, which are both slightly larger than the diameter of the shank of the screw, so that the head 7 is adjacent the plate-like member 1.

This assembly of locking plate 2, plate-like member 1 and screw 6 is then located in a press tool so that the screw head 7 is located in a recess 8 in an anvil 9. A press ram 10, which has an opening 11 for receiving the shank of the screw 6, is then moved axially downwardly in relation to the screw. When the ram engages the locking plate 2 it initially moves the plate towards the member 1 until the end of the protuberance is firmly pressed against the member 1, and then flattens the protuberance 4 of the plate 2 as shown in FIGURE 2. When this occurs the edge of the aperture 5 in the plate 2 moves radially inwardly into engagement with the threads of the screw 6.

The plate 1 is now clamped between the head 7 of the bolt and the locking plate 2. The degree of engagement between the edge of the aperture 5 and the threads of the screw depends on the angle of the cone, and on the clearance, before the protuberance is flattened, between the edge of the aperture 5 and the shank of the bolt. It is possible, for a certain cone angle, to select the clearance either so that it is virtually impossible to remove the screw, or so that it can be removed by a normal screwdriver.

The locking plate 2 is preferably made of a material somewhat softer than that of the bolt, for example soft iron having a carbon content less than 0.3%.

In one assembly in which the present invention was used the locking plate was made of soft iron having a thickness of 1.5 mm., the height of the protuberance was about twice that of the plate thickness, and the diameter of the screw was just over 3 mm. A press of normal size was able to flatten the protuberance substantially completely, and it was possible, with a considerable effort, to remove the screw subsequently.

A convenient method of forming the protuberance 4 in the locking plate is shown in FIGURES 1 to 3. The protuberance is formed by pressing: the anvil of the press has a frusto-conical recess 12 terminating in an aperture 13 the same size as the aperture 5 in the plate-like member is to be; and the ram of the press comprises a complementary frusto-conical shaped part 15 and a punch 16 reciprocable in the ram and having a diameter the same as that of the aperture 5. The locking plate 2 is placed on the anvil, and the ram is lowered as shown in FIGURE 4. This forms the frusto-conical protuberance 4. After the protuberance has been formed, the punch 16 pierces the aperture 5 in the protuberance so that the aperture is cylindrical.

The boss-shaped construction element 17 shown in FIGURES 6 and 7 is part of an automobile door mechanism. The element 17, which corresponds to the plate-like member 1, is connected to a support plate 18, which corresponds to the locking plate 2, by four screws. The protuberances in the support plate 18 were formed simultaneously, and were flattened simultaneously by a single tool. Thus only one, instead of four separate, operations were required to connect the support plate 18 and construction element 17. This represents a substantial saving in time.

FIGURE 8 shows a stack 19 of laminations, possibly capacitor elements, about to be assembled by the method according to the invention. The laminations have aligned apertures in which a flanged sleeve 20 fits, the flange being engaged by the end of the frusto-conical protuberance 4 in the locking plate 2. When pressure is applied to the plate 2, the protuberance will be flattened as described above and the laminations will be firmly held between the screw head 7 and flange of the sleeve 20. The flange prevents the outer lamination from damage by the end of the protuberance whilst the latter is being flattened. The locking plate 2 is prevented from becoming loose by a longitudinal slot 21 in the shank of the screw which, after flattening of the protuberance, is engaged by the edge of the aperture in the protuberance.

If desired the locking plate 2 can be a construction element shaped by pressing simultaneously with the formation of the protuberances. In the assembly shown in FIGURE 8, the protuberances could be formed in the element 17 simultaneously with the formation of the boss. In this case it is advisable for the screw head to engage the support plate 18. This embodiment is shown in FIGURE 9.

The locking plate 2 may if desired be hexagonal to facilitate unscrewing of the screw.

What is claimed is:

1. A method of connecting a screw to a metal plate, said screw being made of harder material than said plate, comprising forming a frusto-conical protuberance in said plate, punching a circular unthreaded aperture in said protuberance whose diameter is only slightly larger than the diameter of said screw and whose axis is aligned with that of said protuberance, inserting said screw into said aperture with the thread of the screw facing the wall of the aperture, holding the top of the protuberance in a fixed axial relation to the threads of the screw while substantially flattening said protuberance by axial pressure so that the metal is cold flowed into the threads of said screw.

2. A method according to claim 1 in which said screw has an axial slot which, on flattening of said plate, is engaged by the edge of said aperture whereby relative rotation between screw and plate is hindered.

3. A method of assembling at least two metal plate-like members comprising forming a frusto-conical protuberance in one of said members, making a circular aperture in said protuberance, the axis of said aperture being aligned with the axis of said plate, locating a headed screw in said circular aperture and in an aperture in said other member so that said head of said screw is remote from said plate having said protuberance and that the thread of the screw faces the wall of the aperture, said screw being made of harder material than that of said plate-like member in which said protuberance is formed, said aperture in said protuberance having a diameter only slightly greater than the shank of said screw, holding the top of the protuberance in a fixed axial relation to the threads of the screw while exerting axial pressure on said head and said plate-like member having said protuberance so as to flatten said protuberance whereby the metal of the plate-like member is cold flowed into the threads of said screw.

4. A method according to claim 3 in which said screw has an axial slot, which on flattening of said plate, is engaged by the edge of said aperture whereby relative rotation between said screw and plate is hindered.

References Cited in the file of this patent

UNITED STATES PATENTS

| | | |
|---|---|---|
| 1,785,924 | Wilson | Dec. 23, 1930 |
| 1,854,730 | Bell | Apr. 19, 1932 |
| 2,127,969 | Dingwerth | Aug. 23, 1938 |